3,773,838
METHOD OF PREPARING DIMETHYL-SULPHOXIDE

Ryszard Andruski, Maria Jedraska, Hersz Lichtensztejn, and Zbigniew Leszczynski, Warsaw, Poland, assignors to Instytut Przemyslu Organicznego
No Drawing. Filed Feb. 29, 1972, Ser. No. 230,469
Claims priority, application Poland, Mar. 1, 1971, P 146,554
Int. Cl. C07c 147/14
U.S. Cl. 260—607 A      6 Claims

ABSTRACT OF THE DISCLOSURE

A method of preparing dimethylsulphoxide by oxidizing dimethyl sulphide by high concentrated (70–100%) solutions of organic hydroperoxides e.g. isopropylbenzene-hydroperoxide or ethylbenzene hydroperoxide. The process is carried out at temperatures of 20°–80° C. in a two-phase system; the first phase is an aqueous solution (1–8 moles $H_2O$/mol DMS) with an acid reaction in which the hydrogen ion concentration is from $10^{-6}$ to 1 g./dm.$^3$ solution, while the second phase is an organic phase. Extraction of dimethylsulphoxide from the reaction solution is effected by the aqueous phase and any remaining dimethylsulphoxide in the organic phase is obtained by means of washing with an aqueous solution of the same hydrogen ion concentration as before. The extracts are distillated under reduced pressure giving pure dimethylsulphoxide. The raffinate is a ready product or can serve as a raw material for further syntheses.

BACKGROUND OF THE INVENTION (a) Field of the invention

The invention relates to a method of preparing dimethylsulphoxide.

(b) Prior art

Different methods are known for preparing dimethylsulphoxide by the oxidation of dimethyl sulphide by means of nitric oxides, solutions of hydrogen peroxide or organic hydroperoxides. See for instance, French patent specification No. 1,580,983.

The known methods all have a number of essential deficiencies.

It is known that the reaction between dimethyl sulphide and organic hydroperoxides proceeds slowly and even when more than ten times greater dimethyl sulphide excess is used, the reaction does not proceed to completion.

In order to increase the reaction velocity for economically realizing this method under industrial conditions, an increase in the reaction temperature is provided. This however gives rise to a considerable worsening of the selectivity of the process and various side reactions are produced leading to obtaining undesirable products such as phenol, acetone, acetophenone etc.

Moreover, undesired further oxidation of the produced dimethylsulphoxide begins to proceed to a greater degree. To prevent this, the process has to be conducted at a lower temperature and with an excess of dimethyl sulphide. This creates, however, other inconveniences associated with the necessity of separating and purifying the excess of the unreacted dimethyl sulphide. The operation of the process at elevated temperatures, e.g. 100°, as stated in the above-mentioned French patent, produces a number of additional difficulties in that the dimethyl sulfide is converted to a gas (the boiling point of dimethyl sulphide is 37°) and that the temperatures exceed or approach the flash point temperature of the compounds to be found in the reaction mixture.

Another, considerable deficiency of the known method is that it precludes the use of concentrated solutions of reacting substances. When concentrated solutions of hydroperoxides are used there was obtained during the extraction of dimethylsulphoxide from the reaction mixture by means of water, a substantially undividable emulsion of the organic and aqueous layers. This was due to the fact that the density of the reaction mixture, when using concentrated solutions, was nearly the same as that of the aqueous dimethylsulphoxide solutions. In order to enable the emulsion to be split up, there is used either dilute (about 30%) solutions of organic hydroperoxides or there is added an additional diluent with a density considerably differing from that of aqueous dimethylsulphoxide solutions. To this end there were preferably used such compounds as carbon tetrachloride, trichloroethylene and other chlorinated hydrocarbons. The addition of the diluent produces a decrease of the hydroperoxide concentration and consequently also a decrease of the reaction rate.

SUMMARY OF THE INVENTION

The invention contemplates a method of obtaining dimethylsulphoxide in which the deficiencies of the known methods are eliminated.

The essence of the invention consists in effecting the oxidation process of dimethyl sulphide by means of organic hydroperoxides in a two-phase system, one phase being during the reaction an aqueous solution of dimethylsulphoxide with acid reaction, while the other non-aqueous phase is an organic phase.

A feature of the invention is that the dimethylsulphoxide extraction is effected with the aid of aqueous solutions with acid reaction in which the hydrogen ion concentration is from $10^{-6}$ to 1 g. per litre solution, preferably $10^{-2}$ to $10^{-3}$ g./litre.

The method according to the invention resides in the introduction of a concentrated (preferably greater than 85%) organic hydroperoxide solution, e.g. isopropylbenzene hydroperoxide or ethylbenzene hydroperoxide, in a stoichiometric amount into an emulsified two-phase system of immiscible liquids: dimethyl sulphide and water or preferably an aqueous solution with acid reaction. The oxidation reaction occurs in the organic phase, and the dimethylsulphoxide formed therein passes to the aqueous phase. When using a concentrated hydroperoxide solution, at a temperature of 30° the reaction rate is so high that the introduction of the hydroperoxide solution is limited solely by the capability of the reaction system for removing the heat from this highly exothermic reaction.

The process can be carried out within a temperature range of 20 to 80° C., preferably at a temperature of 25 to 35° C., to avoid side reactions.

The method of preparing dimethylsulphoxide according to the invention affords the capability of operating an entirely safe and technologically simple process at a high reaction rate, with high concentrations of reacting substance preferably used in stoichiometric proportions and at low reaction temperatures, substantially eliminating any side reactions.

The separation of the two emulsified phases occurs, despite the small density differences, almost immediately, if the concentration of the hydrogen ions in the aqueous phase is maintained within the limits of from $10^{-7}$ g. to 1 g. per litre of solution, preferably $10^{-3}$ to $10^{-2}$ g./litre. The process can be carried out in the presence of water or an aqueous alkali solution but in such case more hydrogen ions are added to the reaction mixture, so that their concentration in the aqueous phase is preferably $10^{-3}$ to $10^{-2}$ g. per litre of solution.

To remove entirely remaining dimethylsulphoxide from the organic phase, the latter is washed several times with an aqueous solution having the same hydrogen ions concentration as before.

To obtain pure dimethylsulphoxide, the obtained united extracts are subjected to distillation under reduced pressure according to known methods. The raffinate is a ready product or a raw material for further syntheses.

DESCRIPTION OF THE PREFERRED EMBODIMENTS

The invention will now be described with reference to the following example.

Example

In a reactor, surface-cooled with water and provided with an agitator and connected to a feeder and a reflux condenser, there were added 19.7 kg. of 90.5% dimethyl sulphide and 14.7 kg. of a 0.03% aqueous sulphuric acid solution. Then, to this two-phase system there were added, while continuously stirring, 48.4 kg. of 87% isopropylbenzene hydroperoxide at a rate of 0.27 kg./min. The rate of introduction of the hydroperoxide and cooling of the reactor were regulated so that the temperature of the reaction liquid was 30° C. After the entire hydroperoxide amount was introduced, the reaction solution was still agitated for about 30 minutes, whereupon the mixture was left for 10 minutes for the purpose of delamination. Then the lower layer containing 22.6 kg. of a 42% aqueous solution of dimethylsulphoxide solution was discharged from the reactor. To the organic phase which remained in the reactor, 7.9 kg. of a 0.03% aqueous sulphuric acid solution was added and the mixture stirred for 2 minutes, whereafter it was also left for 10 minutes for delamination. This operation was repeated four times obtaining successively: 13.2; 11.4; 10.4 and 8.8 kg. of an extract containing respectively: 34.4; 26.2; 15.8 and 10.0% of dimethylsulphoxide. At the same time 48 kg. of raffinate were obtained. From the united extracts, the water is driven off under a pressure of 100–200 mm. Hg, and then under a pressure of 30 mm. Hg the dimethylsulphoxide was distilled, obtaining 19.2 kg. of a product containing 99% dimethylsulphoxide.

What is claimed is:

1. A method of preparing dimethylsulphoxide comprising combining dimethyl sulphide and an aqueous acid solution to produce an aqueous phase and a non-aqueous phase, the concentration of the acid and the relative amount thereof to the dimethyl sulphide being such as to provide a hydrogen ion concentration in the aqueous phase of from $10^{-7}$ to 1 g. per litre solution, adding isopropylbenzene hydroperoxide or ethylbenzene hydroperoxide to the two-phase system to oxidize the dimethyl sulphide to dimethylsulphoxide which separates into the aqueous phase, and separating any dimethylsulphoxide remaining in the non-aqueous phase by contacting the latter with an aqueous solution having a hydrogen ion concentration of from $10^{-6}$ to 1 g. per litre of solution.

2. A method according to claim 1 wherein the hydrogen ion concentration in the aqueous phase is $10^{-3}$ to $10^{-2}$ g./litre.

3. A method according to claim 1 wherein the oxidation step is carried out at a temperature of 20–80° C.

4. A method according to claim 3 wherein the temperature at which the oxidation step is carried out is 25 to 35° C.

5. A method according to claim 1 wherein the oxidation step is carried out with 2 to 8 mols of the aqueous phase for each mol of dimethyl sulphide.

6. A method according to claim 1 wherein theh organic hydroperoxide is in a concentration of between 70 and 100%.

References Cited

FOREIGN PATENTS

| 206,579 | 2/1968 | Russia | 260—607 A |
|---|---|---|---|
| 1,580,983 | 12/1969 | France | 260—607 A |

LEWIS GOTTS, Primary Examiner

D. R. PHILLIPS, Assistant Examiner